(12) United States Patent  (10) Patent No.: US 8,063,927 B2
Kato  (45) Date of Patent: *Nov. 22, 2011

(54) OPTICAL SCANNING APPARATUS AND IMAGE-FORMING APPARATUS USING THE SAME

(75) Inventor: Manabu Kato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

This patent is subject to a terminal disclaimer.

(21) Appl. No.: 12/323,335

(22) Filed: Nov. 25, 2008

(65) Prior Publication Data

US 2009/0079810 A1    Mar. 26, 2009

Related U.S. Application Data

(63) Continuation of application No. 11/536,172, filed on Sep. 28, 2006, now Pat. No. 7,466,333.

(30) Foreign Application Priority Data

Oct. 12, 2005   (JP) .................................. 2005-297617

(51) Int. Cl.
   *B41J 2/435*   (2006.01)
(52) U.S. Cl. ........................................ 347/236; 347/246
(58) Field of Classification Search .................. 347/236, 347/237, 246, 247, 229, 234, 235, 248–250
   See application file for complete search history.

(56) References Cited

U.S. PATENT DOCUMENTS

| | | | |
|---|---|---|---|
| 4,812,861 A | 3/1989 | Sasaki et al. | |
| 5,309,270 A | 5/1994 | Yamakawa | |
| 5,357,106 A * | 10/1994 | Wilson | 250/236 |
| 5,432,537 A | 7/1995 | Imakawa et al. | |
| 5,497,184 A | 3/1996 | Saito et al. | |
| 5,671,077 A | 9/1997 | Imakawa et al. | |
| 5,959,655 A | 9/1999 | Maruo et al. | |
| 6,278,108 B1 * | 8/2001 | Ori | 250/235 |
| 6,429,956 B2 * | 8/2002 | Itabashi | 359/204.1 |
| 6,785,030 B2 | 8/2004 | Ishihara | |
| 6,919,978 B2 | 7/2005 | Kudo | |
| 6,972,783 B2 | 12/2005 | Takamatsu et al. | |
| 7,368,706 B2 * | 5/2008 | Suzuki | 250/235 |
| 2003/0234968 A1 | 12/2003 | Kudo | |

FOREIGN PATENT DOCUMENTS

| | | |
|---|---|---|
| EP | 1075137 A2 | 2/2001 |
| EP | 1557785 A1 | 7/2005 |
| JP | 04-321370 A | 11/1992 |
| JP | 05-030314 A | 2/1993 |
| JP | 2002-040350 A | 2/2002 |

* cited by examiner

*Primary Examiner* — Hai C Pham
(74) *Attorney, Agent, or Firm* — Canon U.S.A., Inc. I.P. Division

(57) ABSTRACT

An optical scanning apparatus includes a light source and a structure for performing light-power control for the light source, the structure including a light-power-detection optical unit that establishes an optically conjugate relationship between a deflecting surface of a deflecting unit and a light-receiving surface of a light-power detector in a main-scanning plane. Accordingly, the storage time of a light beam on the light-power-detection optical unit is increased and variation in the power of light emitted by the light source due to heat generated by the light source and environmental variation is accurately detected.

11 Claims, 12 Drawing Sheets

OPTICAL SCANNING APPARATUS AND IMAGE-FORMING APPARATUS USING THE SAME

CROSS REFERENCE TO RELATED APPLICATIONS

This application is a continuation of U.S. patent application Ser. No. 11/536,172 filed Sep. 28, 2006, which claims the benefit of Japanese Patent Application No. 2005-297617 filed Oct. 12, 2005, each of which is hereby incorporated by reference herein in its entirety.

BACKGROUND OF THE INVENTION

1. Field of the Invention

The present invention relates to an optical scanning apparatus suitable for use in a laser beam printer, a digital copy machine, a multifunction printer, etc., that perform electrophotography processes, and an image-forming apparatus including the optical scanning apparatus.

2. Description of the Related Art

In a conventional optical scanning apparatus for a laser beam printer, a copy machine, etc., a light beam that is optically modulated in accordance with an image signal is emitted from a light source, is periodically deflected and scanned by a rotating polygon mirror, and is guided toward the surface of a recording medium (photosensitive drum).

The light beam deflected and scanned by a deflecting surface of the polygon mirror is caused to form a spot on the surface of the photosensitive recording medium (photosensitive drum) by an fθ lens. Thus, image recording is performed by optically scanning the surface of the recording medium.

FIG. 10 is a schematic diagram illustrating the main portion of a conventional optical scanning apparatus.

Referring to FIG. 10, a divergent light beam is emitted form a light source 1 and is collimated by a collimating lens 2. Then, the collimated light beam is incident on a cylindrical lens 4 having a predetermined refractive power only in a sub-scanning direction after the width of the light beam is restricted by a diaphragm 3.

The collimated light beam incident on the cylindrical lens 4 exits the cylindrical lens 4 without a change in a main-scanning cross section (plane).

The light beam converges in a sub-scanning cross section (plane), thereby forming a line image on a deflecting surface (reflective surface) 5a of the polygon mirror 5.

The light beam is deflected and scanned by the deflecting surface 5a of the polygon mirror 5 and is guided toward a photosensitive drum surface 8, which functions as a surface to be scanned, through an fθ lens 6. The polygon mirror 5 is rotated in the direction shown by the arrow A, so that the photosensitive drum surface 8 is optically scanned in the direction shown in the figure and image information is recorded thereon (refer to, for example, Japanese Patent Laid-Open No. 04-321370 and Japanese Patent Laid-Open No. 2002-40350).

In general, a semiconductor laser capable of direct modulation is used as a light source for an optical scanning apparatus.

Power of light emitted from the semiconductor laser varies depending on heat emitted from the semiconductor laser itself and environmental variation (for example, ambient temperature variation).

Therefore, generally, the power of light emitted is constantly detected and automatic power control is performed such that the power of the light beam emitted from a light-emitting portion of the light source is always maintained constant.

Various automatic power control methods for the semiconductor laser are suggested and put into practical use.

For example, in a first method, which is most commonly used, a rear light beam that is emitted from a semiconductor laser in a direction opposite to the direction in which an image-drawing light beam is emitted (i.e., a light beam emitted from a rear side of a semiconductor substrate) is detected and used for the light-power control.

The image-drawing light beam is a light beam used for forming dots in an image effective area on the photosensitive drum surface.

According to the first method, a photosensor, which functions as a light-power detector, can be installed in a package of the laser light source. Therefore, the overall size is relatively small and the light-power control for the light source can be easily performed.

However, since a light beam other than the image-drawing light beam is monitored by the photosensor and the influence of heat emitted by the light source is significant, it is difficult to perform high-accuracy light-power control (automatic power control).

In addition, it is difficult to apply the first method to a light source like a vertical cavity surface emitting laser (VCSEL) that does not emit a rear light beam.

On the other hand, recently, the vertical cavity surface emitting laser has been attracting attention as a light source for an optical scanning apparatus. Compared to a conventional edge emitting laser, the vertical cavity surface emitting laser is characterized in that the number of light-emitting points can be considerably increased, two-dimensional parallel integration is possible, and the layout of the light-emitting points is easy.

In the vertical cavity surface emitting laser, light is emitted in a direction perpendicular to the semiconductor substrate. Therefore, the rear light beam is basically not emitted and it is difficult to use the light-power control method in which the rear light beam is used.

Japanese Patent Laid-Open No. 04-321370 discusses a second method in which the light-power control is performed using a portion of a light beam emitted from a semiconductor laser that is blocked by an aperture diaphragm.

According to the method discussed in Japanese Patent Laid-Open No. 04-321370, light-power control (automatic power control) can be performed without being affected by heat emitted from the light source.

However, as the utilization ratio of the image-drawing light beam is increased, the power of light that can be used for the automatic power control is reduced in inverse proportion to the utilization ratio.

In addition, although the light used for the automatic power control is not the rear light beam used in the first method, the blocked light beam, which is different from the image-drawing light beam in practice, is used and it is still difficult to perform high-accuracy light-power control.

Japanese Patent Laid-Open No. 2002-40350 discusses a third method in which light-power control (automatic power control) is performed by separating a portion of a light beam that travels from a light source to a deflecting unit with a half mirror and guiding the separated portion toward a light-receiving element (photosensor).

According to the method discussed in Japanese Patent Laid-Open No. 2002-40350, a portion of the actual image-drawing light beam is used. Therefore, high-accuracy automatic power control can be performed.

However, since a portion of the image-drawing light beam is separated, a loss occurs in the power of the image-drawing light beam.

In addition, an expensive optical element, such as a half mirror, is required for separating a portion of the image-drawing light beam.

In particular, when the above-described vertical cavity surface emitting laser is used, high-power light emission is basically difficult compared to the case in which the edge emitting laser is used. Therefore, the loss in the power of the image-drawing light beam caused when a portion of the image-drawing light beam is separated and detected by the light-receiving element is a serious problem.

The output of the edge emitting laser is generally several tens of milliwatts, whereas the output of the vertical cavity surface emitting laser is generally less than several milliwatts. Therefore, when the vertical cavity surface emitting laser is used, the loss in the power of the image-drawing light beam is a serious problem.

SUMMARY OF THE INVENTION

In light of the above-described situation, the present invention is directed to an inexpensive, simple automatic power control method with which light-power control can be performed without causing loss in power of image-drawing light beam.

According to at least one embodiment of the present invention, the light-power control is performed using an image-drawing light beam that is actually used, so that a vertical cavity surface emitting laser, which is a low-output light source, can be used.

In addition, according to at least one embodiment of the present invention, the light-power control is performed using an image-drawing light beam that is actually used, so that high-accuracy light-power control can be performed. Accordingly, high-speed, high-definition optical scanning apparatus and image-forming apparatus can be obtained and the size and cost thereof can be reduced.

According to a first aspect of the present invention, there is provided an optical scanning apparatus including a light source that emits a light beam; a deflecting unit having a deflecting surface that deflects and scans the light beam emitted from the light source; a light-power detector that detects the intensity of the light beam deflected and scanned by the deflecting surface of the deflecting unit; an imaging optical unit that focuses the light beam deflected and scanned by the deflecting surface of the deflecting unit on a surface to be scanned; a light-power-detection optical unit for guiding the light beam deflected and scanned by the deflecting surface of the deflecting unit toward the light-power detector; and an automatic power controller that controls the intensity of the light beam emitted from the light source on the basis of a signal obtained from the light-power detector.

According to the first aspect of the present invention, the light-power-detection optical unit establishes an optically conjugate relationship between the deflecting surface of the deflecting unit and a light-receiving surface of the light-power detector in the main-scanning plane.

Therefore, the storage time of the light beam on the light-power-detection optical unit is increased and variation in the power of light emitted by the light source due to heat generated by the light source and environmental variation is accurately detected.

As a result, the power of light emitted from the light-emitting portions of the light source can be maintained constant.

Further features of the present invention will become apparent from the following description of exemplary embodiments with reference to the attached drawings.

DESCRIPTION OF THE EMBODIMENTS

First, the definition of automatic power control (APC) according to embodiments of the present invention will be described.

The automatic power control (light-power control) is performed to stabilize the output of a light beam (laser beam), which is used for raster scanning a photosensitive drum surface to form an electrostatic latent image, with respect to temperature variation. The light beam (laser beam) is output from a light-emitting element of a light source and is detected (for example, once every horizontal scanning) by a light-power detector, and the thus obtained output signal is fed back to a laser driving circuit. Accordingly, the intensity (light-power) of the light beam (laser beam) is controlled such that the output of the light beam (laser beam) is maintained constant at a predetermined set value (refer to, for example, Japanese Patent Laid-Open No. 05-30314).

First Embodiment

Figure 1:
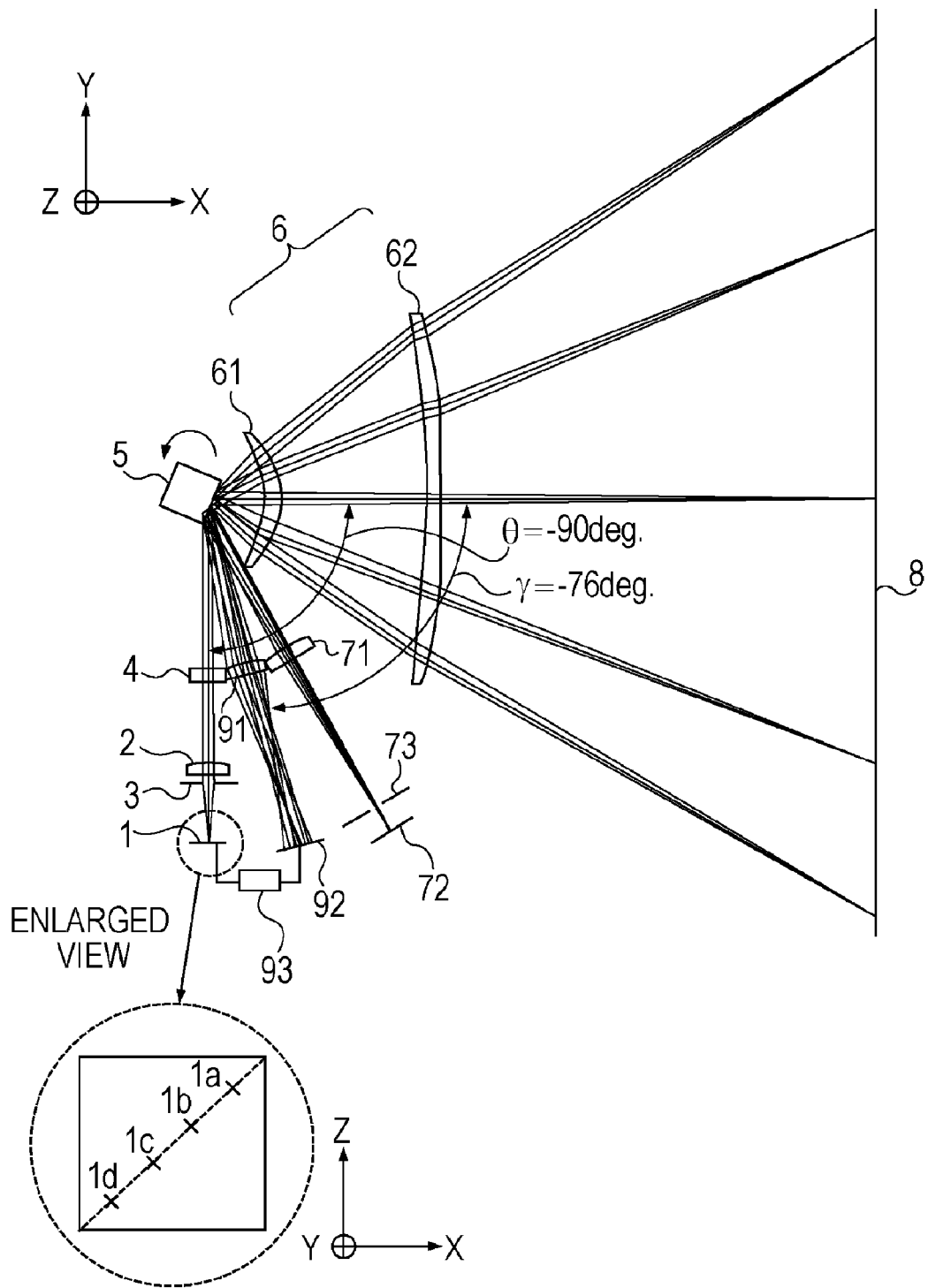
FIG. 1 is a main-scanning sectional view of an optical scanning apparatus according to a first embodiment of the present invention.

FIG. 1 is a sectional view taken along a main-scanning direction (hereafter called a main-scanning sectional view) of an optical scanning apparatus according to a first embodiment of the present invention.

Figure 2:
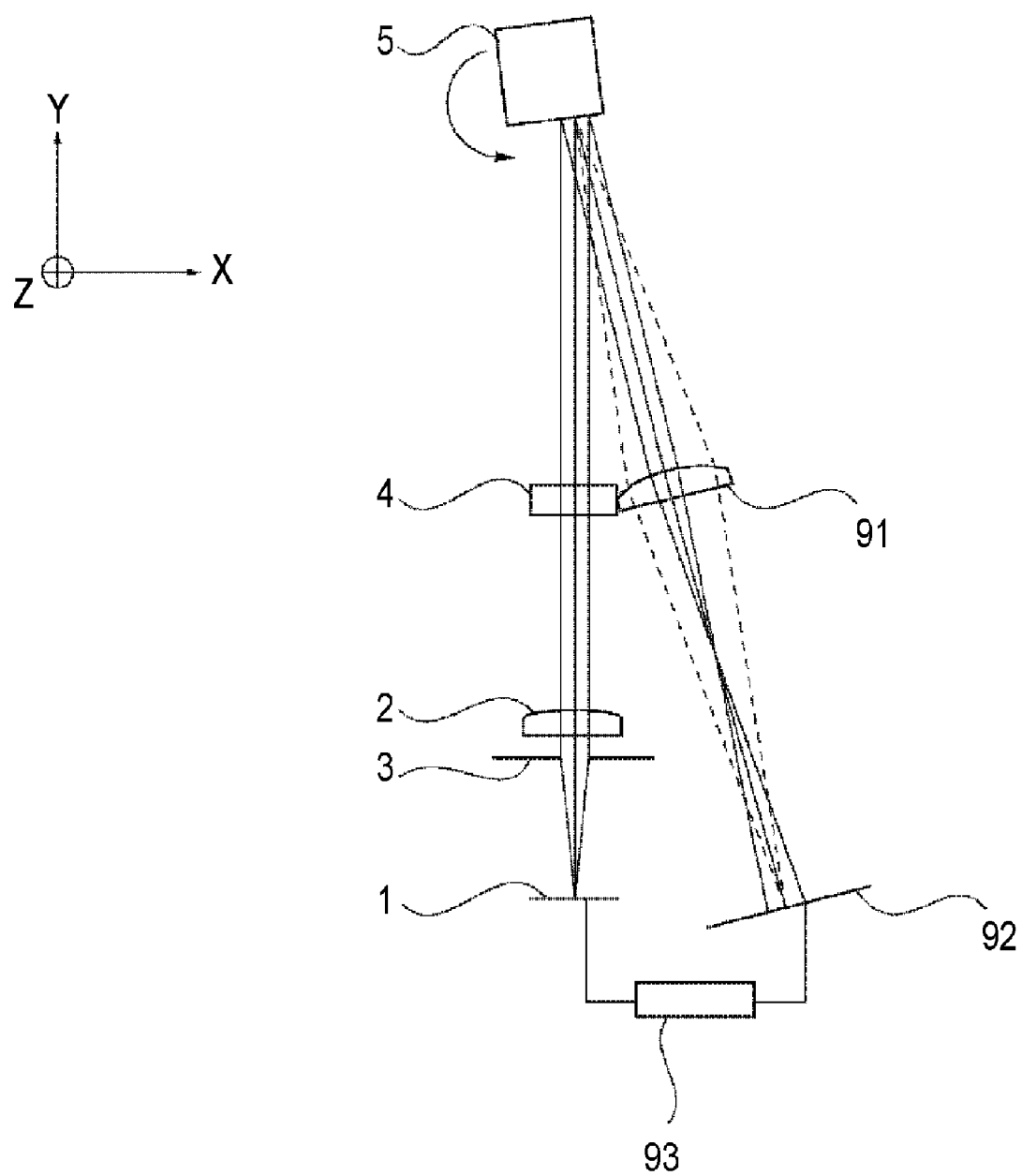
FIG. 2 is a main-scanning sectional view of an incident optical unit and a light-power detector included in the optical scanning apparatus according to the first embodiment of the present invention.
Figure 3:
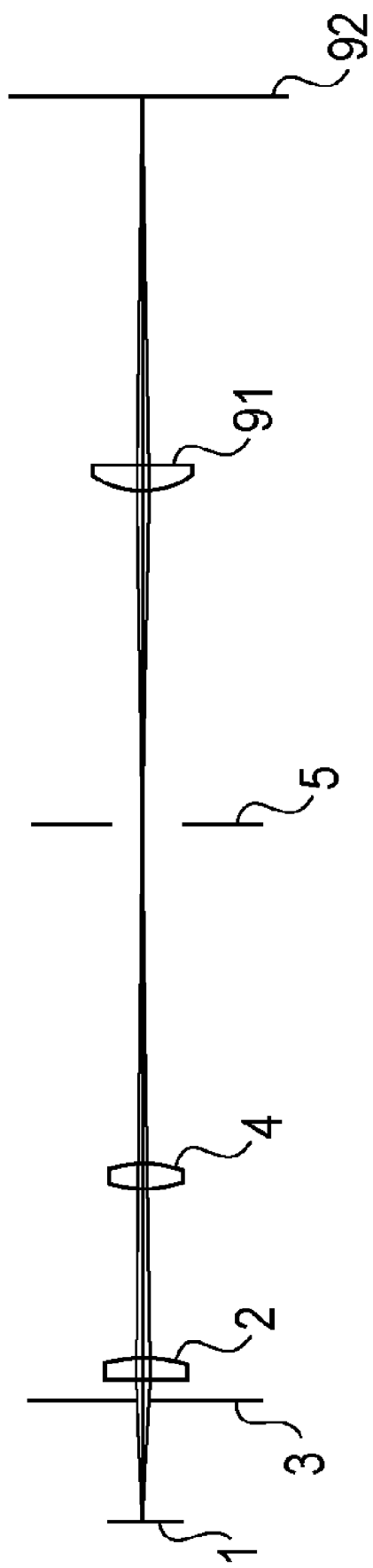
FIG. 3 is a sub-scanning sectional view of the incident optical unit and the light-power detector included in the optical scanning apparatus according to the first embodiment of the present invention.

FIG. 2 is a main-scanning sectional view of an incident optical system and a light-power-detecting optical system included in the optical scanning apparatus according to the first embodiment. FIG. 3 is a sectional view taken along a sub-scanning direction (hereafter called a sub-scanning sectional view) of the incident optical system and the light-power-detecting optical system included in the optical scanning apparatus according to the first embodiment.

Here, the main-scanning direction refers to a direction perpendicular to a rotating axis of a deflecting unit (direction in which a light beam is scanned) and the sub-scanning direction refers to a direction parallel to the rotating axis of the deflecting unit (direction in which an image carrier is moved).

A semiconductor laser 1, which functions as a light source, is a vertical cavity surface emitting laser and includes four light-emitting points.

As shown in FIG. 1, four light-emitting portions are arranged along a line, the line being disposed at predetermined angles relative to the main-scanning direction (Y direction) and the sub-scanning direction (X direction).

For simplicity, only one light beam (laser beam) is shown in FIG. 1.

Four divergent light beams emitted from the semiconductor laser 1 are converted into four collimated light beams by a common collimating lens 2 after the widths thereof in the main-scanning direction and the sub-scanning direction are restricted by a diaphragm 3.

Then, the four light beams are incident on a cylindrical lens 4 having a refractive power only in the sub-scanning direction and are focused on a deflecting surface of a rotating polygon mirror 5, which functions as a deflecting unit, in the sub-scanning direction. In the main-scanning direction, the collimated light beams are incident on the reflective surface of the polygon mirror 5 without a change.

An imaging optical system 6 establishes a conjugate relationship between the deflecting surface of the polygon mirror 5 and a photosensitive drum surface in the sub-scanning cross section (plane). Accordingly, a surface-tilt correcting system is provided in the optical scanning apparatus according to the present embodiment.

The polygon mirror 5, which functions as a deflecting unit, is rotated by a drive unit (not shown), such as a motor, at a constant speed in the direction shown by the arrow.

The four light beams deflected and scanned by the polygon mirror 5 are incident on the imaging optical system 6 having an fθ characteristic.

In the present embodiment, the imaging optical system 6 includes two toric lenses 61 and 62 composed of plastic.

After the fθ characteristic is provided and the field curvatures in the main-scanning direction and the sub-scanning direction are corrected, the four light beams are guided toward a photosensitive drum surface 8, which functions as a surface to be scanned.

The photosensitive drum surface 8 is optically scanned in the +Y direction by rotating the polygon mirror 5 in the direction shown by the arrow.

Thus, scanning lines are formed on the photosensitive drum surface 8 and image recording is performed.

In the light beams deflected by the polygon mirror 5 which functions as a deflecting unit, portions of the light beams that travel toward an area outside an image effective area are guided toward a synchronization detection sensor 72 through a synchronization-detection optical element 71.

The synchronization detection sensor 72 outputs a synchronization detection signal for determining timing for writing an image.

Similarly, in the light beams deflected by the polygon mirror 5 which functions as a deflecting unit, portions of the light beams that travel toward an area outside the image effective area are guided toward a light-power detection sensor 92, which functions as a light-power detector, thought a light-power detection optical element 91.

The light-power detection sensor 92 outputs a signal for controlling the power of light emitted from the light source (automatic power control).

Thus, according to the present invention, the light beams are deflected by the deflecting unit, and then the light-power control for the light source 1 is performed using the deflected light beams. Accordingly, the following characteristics are provided.

(1) Since the rear light beam is not used and the powers of light beams equivalent to the actual image-drawing light beams are detected, high-accuracy light-power control can be performed which can deal with change in laser characteristics, including far-field pattern (FFP), due to environmental variation (for example, ambient temperature variation).

(2) Since portions of the image-drawing light beams are not separated using a separating element, such as a half mirror, for light-power detection, loss in the light-power does not occur during the light-power detection.

Next, the light source according to the present embodiment will be described below.

As described above, the light source according to the present embodiment is a vertical cavity surface emitting laser (VCSEL) having four light-emitting points that are arranged adjacent to each other.

In the vertical cavity surface emitting laser, light is emitted in a direction perpendicular to the semiconductor substrate. Therefore, compared to a conventional edge emitting laser, the number of light-emitting points can be considerably increased, two-dimensional parallel integration is possible, and the layout of the light-emitting points is easy.

However, in the surface emitting laser, the power of light emitted from each light-emitting point is small compared to that of the edge emitting laser. In addition, unlike the edge emitting laser, the rear light beam is not emitted. Therefore, the light-power control is difficult.

Accordingly, when the surface emitting laser is used, the following structure is provided in the light-power control method (automatic power control method) according to the present invention.

The role of a light-power controller 93 (automatic power controller) and a light-power detection optical system will be described in comparison with a synchronization-detection optical system.

To perform synchronization detection, the synchronization detection sensor 72 can be scanned with light at a high speed and the light beams can be focused on the synchronization detection sensor 72 or on the synchronization detection slit 73 disposed in front of the synchronization detection sensor 72 at least in the main-scanning direction.

Therefore, the synchronization-detection optical element 71 focuses the collimated light beams from the polygon mirror 5 on the synchronization detection sensor 72 or on the slit 73 disposed in front of the synchronization detection sensor 72 in the main-scanning direction.

In the sub-scanning direction, focusing is not particularly important for the synchronization detection. Therefore, the power of the synchronization-detection optical element 71 is set such that all of the divergent light from the polygon mirror is incident on a light-receiving surface of the synchronization detection sensor 72.

To perform the light-power control for the light source, a storage time at the light-power detection sensor 92 must be a predetermined time or more, and the light beams can be stationary on the light-power detection sensor 92 during that time.

Therefore, in the present embodiment, the light-power detection optical element 91 is disposed so as to establish a conjugate relationship between the deflecting surface of the polygon mirror 5 and the light-receiving surface of the light-power detection sensor 92 in the main-scanning direction.

In FIG. 2, the solid line shows the actual light beam and the dashed lines show the conjugate (imaging) relationship.

In the main-scanning direction, the collimated light beams from the polygon mirror 5, which functions as a deflecting unit, are once caused to converge at a position between the light-power detection optical element 91 and the light-power detection sensor 92 by the light-power detection optical element 91, and are then incident on the light-power detection sensor 92 in the form of divergent light.

At this time, as described above, a conjugate relationship is established between the deflecting surface of the deflecting unit and the light-receiving surface in the main-scanning direction. Therefore, even when the deflecting surface of the deflecting unit rotates, the light beams incident on the light-power detection sensor 92 are stationary unless the light beams are displaced from the light-power detection optical element 91.

Accordingly, in the main-scanning direction, as long as the light beams are incident on the light-power detection optical element 91, the light beams are stationary on the light-receiving surface of the light-power detection sensor 92.

With regard to the sub-scanning direction, since the divergent light beams are emitted from the polygon mirror 5, a conjugate relationship is established between the deflecting surface and the light-receiving surface of the light-power detection sensor 92 and the light beams are caused to converge on the light-receiving surface, similar to the main-scanning direction.

Therefore, the light beams form line images that extend in the main-scanning direction on the light-receiving surface of the light-power detection sensor 92, similar to the deflecting surface of the polygon mirror 5.

The light-power detection sensor 92 detects the intensities (powers) of the light beams on the light-receiving surface thereof, and outputs intensity signals to the light-power controller 93 (automatic power control circuit).

Then, the light-power controller 93 (automatic power control circuit) outputs intensity correction signals to four light-emitting portions 1a, 1b, 1c, and 1d in the light source 1 so that the intensities (powers) of the light beams emitted from the four light-emitting portions 1a, 1b, 1c, and 1d are maintained as a predetermined set value.

In the present embodiment, the cylindrical lens 4, the light-power detection optical element 91, and the synchronization-detection optical element 71 are composed of plastic and are formed integrally by injection molding.

In addition, the semiconductor laser 1, the light-power detection sensor 92, and the synchronization detection sensor 72 are arranged on the same substrate. Thus, the light-power control for the light source can be performed using a small, inexpensive structure. The light-power detection optical element may also be formed integrally with other components, such as the collimating lens, the diaphragm, etc.

Table 1 shows the optical design values of the structure along the optical path from the light source to the light-power detector via the deflecting unit.

TABLE 1

Optical Arrangement

| | No. | Ry | Rz | Asph | D | Glass | N |
|---|---|---|---|---|---|---|---|
| Light-Emitting Surface of Light Source 1 | 1 | | | | 1.75 | | |
| Cover Glass | 2 | | ∞ | | 0.25 | bsl7 | 1.51052 |
| | 3 | | ∞ | | 13.80 | | |
| Diaphragm 3 | 4 | | | | 2.53 | | |
| | 5 | | ∞ | | 3.00 | lah66 | 1.76167 |
| Collimating Lens 2 | 6 | | −15.216 | | 21.27 | | |
| Cylindrical Lens 4 | 7 | ∞ | 39.935 | | 3.00 | | 1.52397 |
| | 8 | ∞ | −51.630 | | 42.80 | | |
| Deflecting Surface of Deflecting Unit 5 | 9 | | ∞ | | 42.00 | | |
| Light-power detection optical element 91 | 10 | | 11.264 | k = −0.88171 | 3.20 | | 1.52397 |
| | 11 | | ∞ | | 47.00 | | |
| Sensor Surface of Light-power detection sensor 92 | 12 | | | | | | |

| | | |
|---|---|---|
| Angle between optical axis of imaging optical system 6 and optical axis of incident optical system in main-scanning direction | θ | −90 deg. |
| Angle between optical axis of imaging optical system 6 and optical axis of light-power detection optical system in main-scanning direction | γ | −76 deg. |

Light Source

| | |
|---|---|
| Wavelength | 790 nm |
| Number of Light-Emitting Portions | 4 (1 row × 4 lines) |
| Intervals between Light-Emitting Portions | 100 μm |

According to the above-described structure, the light beams are completely stationary on the light-power detection sensor 92 in a paraxial area.

However, when the light-power detection optical element 91 is a spherical lens, the light beams slightly move due to the spherical aberration of the light-power detection optical element 91 in the main-scanning cross section (plane).

In the present embodiment, to reduce the movement of the light beams, the incident surface of the light-power detection optical element 91 is formed as a rotationally symmetrical aspheric surface so that the spherical aberration can be corrected.

When the intersecting point between the incident surface of the light-power detection optical element 91 and the optical axis is the origin, X is the optical axis direction, and h is the radial direction perpendicular to the optical axis direction, the shape of the incident surface is defined as follows:

$$X = \frac{\frac{h^2}{R}}{1 + \sqrt{1 - (1+k)\left(\frac{h}{R}\right)^2}}$$

To achieve stable light-power detection, the length of the light-power detection sensor 92 in the main-scanning direction must be larger than the beam diameter of the light beams on the light-power detection sensor 92 in the main-scanning direction.

When the movement of the light beams in the main-scanning direction remains on the light-receiving surface of the light-power detection sensor 92, the amount of movement must also be taken into account to determine the length of the light-power detection sensor 92. Therefore, the correction of the spherical aberration of the light-power detection optical element 91 is also important from the standpoint of reduction in size of the light-power detection sensor 92.

Figure 4:
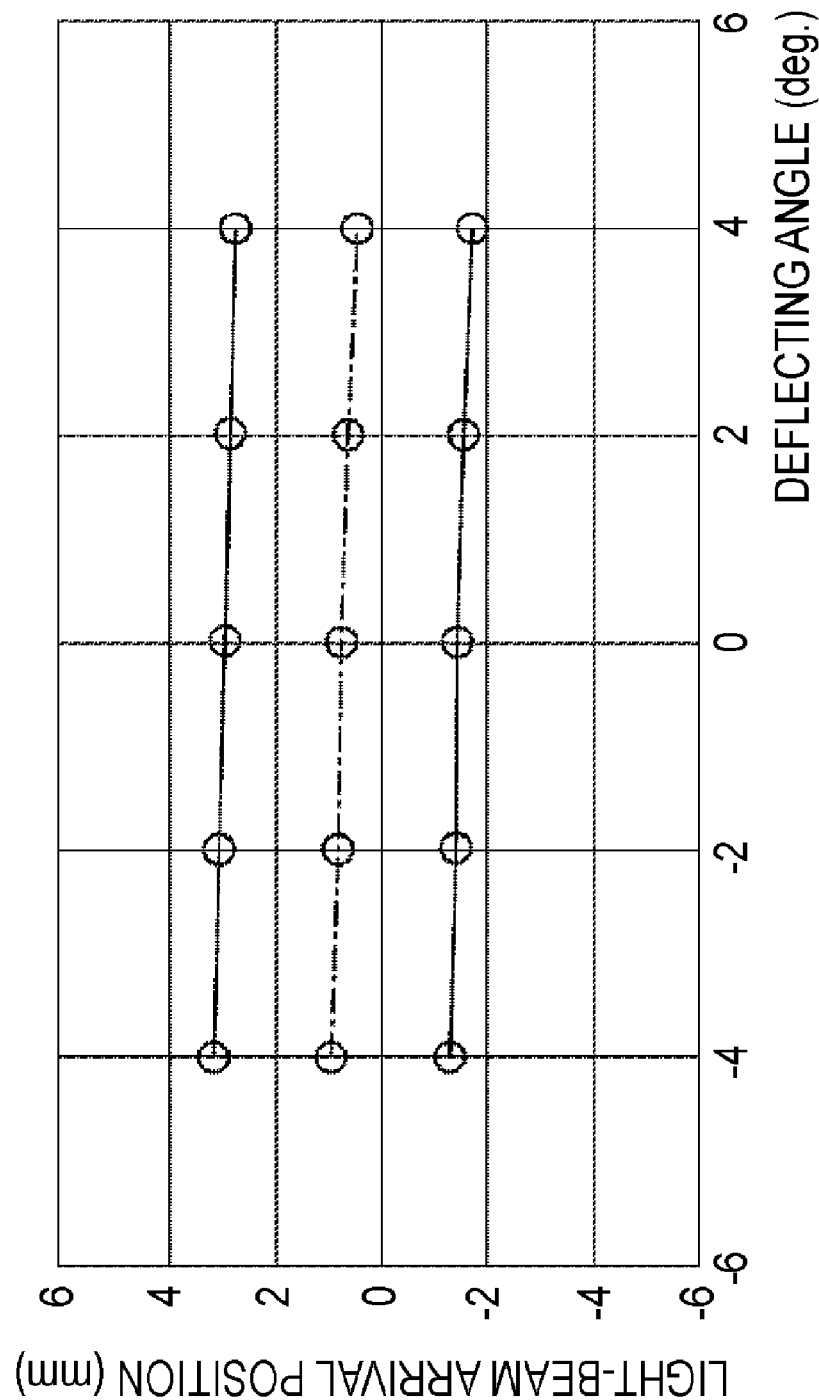
FIG. 4 is a diagram illustrating the manner in which a light beam on the light-power detector moves in response to the rotation of a deflecting unit according to the first embodiment of the present invention.

FIG. 4 illustrates the manner in which a light beam on the light-power detection sensor 92 moves in response to the rotation of the polygon mirror 5 according to the present embodiment.

Figure 5:
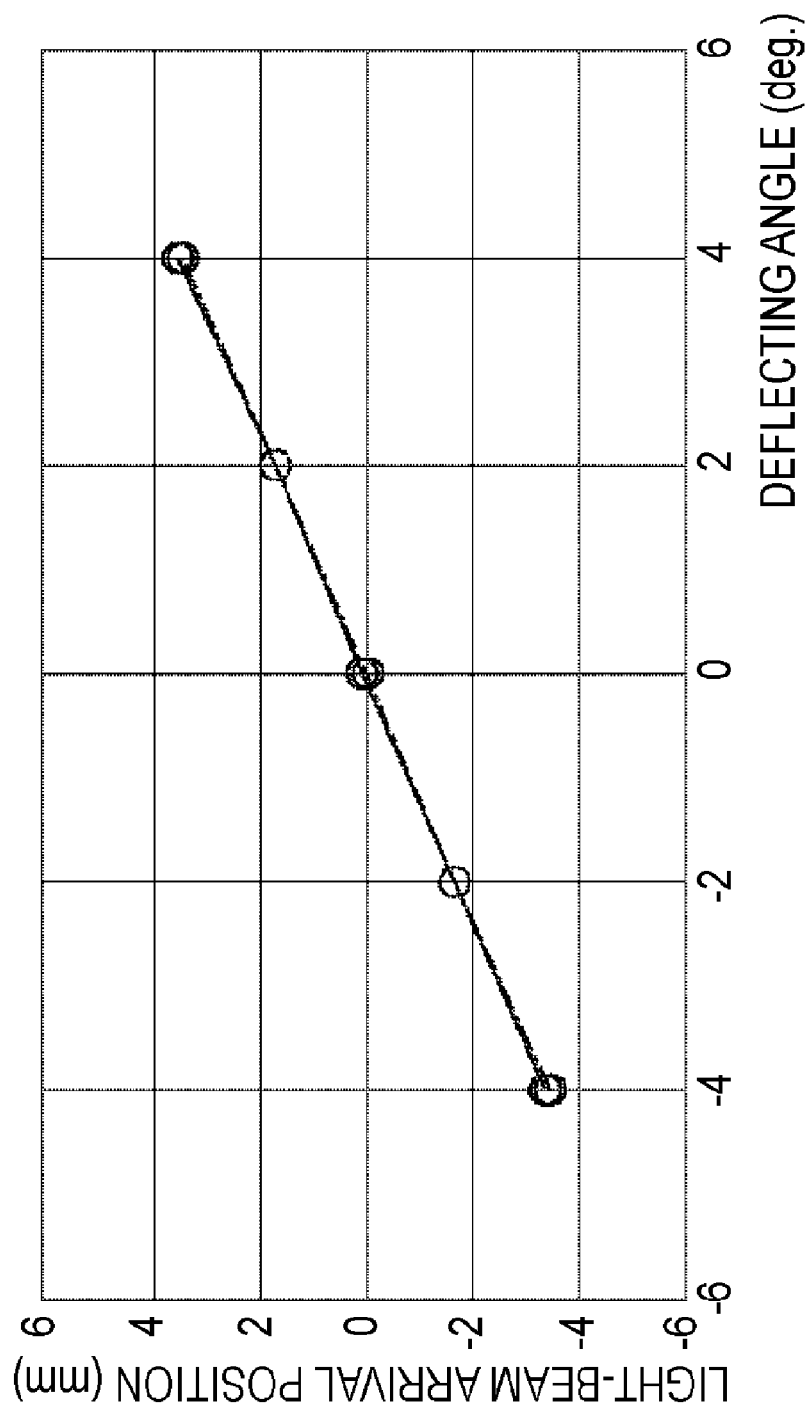
FIG. 5 is a diagram illustrating the manner in which a light beam on a synchronization detector moves in response to the rotation of a deflecting unit according to the first embodiment of the present invention.

As a reference, FIG. 5 shows the movement of a light beam on the synchronization detection sensor 72.

In FIGS. 4 and 5, the dot-dash line shows the principal ray of the light beam and the solid lines show the marginal rays of the light beam in the main-scanning direction.

In FIG. 4, the two marginal rays in the main-scanning direction are an upper ray and a lower ray.

In FIGS. 4 and 5, the horizontal axis shows the deflecting angle of the light beam (positional reference of the light-power detection sensor 92) and the vertical axis shows the arrival position of the light beam (positional reference of the light-power detection sensor 92).

With regard to the positional reference of the light-power detection sensor 92, the optical axis of the light-power detection optical system (the optical axis of the light-power detection optical element 91) is set as a reference (zero) of the light-beam arrival position in the main-scanning cross section (plane).

In FIG. 1, with the optical axis of the light-power detection optical system (the optical axis of the light-power detection optical element 91) being set as a reference (zero) of the light-beam arrival position, a clockwise movement of the light beam (direction in which the light-receiving surface is scanned by the light beam) is defined as negative and a counterclockwise movement of the light beam (direction in which the light beam approaches the imaging optical system 6 in the main-scanning direction) is defined as positive.

In the main-scanning cross section (plane), an optically conjugate relationship is established between the deflecting surface and the light-receiving surface. Therefore, although the light beam has a certain width on the light-receiving surface, the arrival position of the light beam on the light-receiving surface in the main-scanning direction barely changes even when the deflecting angle of the polygon mirror changes.

In the synchronization-detection optical system, the principal ray and the outermost rays of the light beam coincide with one another on the light-receiving surface of the synchronization detection sensor 72 in the main-scanning cross section (plane). More specifically, in the main-scanning cross section (plane), the light beam is focused on the light-receiving surface of the synchronization detection sensor 72.

However, in the main-scanning cross section (plane), the deflecting surface of the polygon mirror 5 and the light-receiving surface of the synchronization detection sensor 72 are not in an optically conjugate relationship.

Therefore, as the deflecting angle of the polygon mirror 5 changes, the light beam arrival position on the light-receiving surface of the synchronization detection sensor 72 in the main-scanning direction largely changes while the light beam is being incident on the synchronization-detection optical element 71.

The scanning angular velocity Vapc on the light-power detection sensor 92 in the light-power-detection optical system can satisfy the following expression:

$Vapc < f/10$ where f is the fθ coefficient (mm/rad) of the optical scanning apparatus.

When this parameter exceeds the upper limit, the length of the light-receiving surface of the light-power detection sensor 92 in the main-scanning direction is increased and it becomes difficult to provide a small, inexpensive light-power detection optical system.

In the present embodiment, Vapc is 3.2 (mm/rad) and f is 150 (mm/rad). Thus, the above expression is satisfied.

In the present embodiment, the light beams incident on the imaging optical system 6 are collimated. Therefore, the fθ coefficient f of the optical scanning apparatus is equal to the focal length of the imaging optical system 6.

The fθ coefficient is the moving distance of the light beams on the scanned surface per unit deflecting angle of the polygon mirror 5, and indicates the scanning angular velocity of the optical scanning apparatus.

An imaging magnification βam between the deflecting surface of the deflecting unit and the light-receiving surface of the light-power detection sensor 92 provided by the light-power detection optical element 91 in the main-scanning direction can satisfy the following expression:

$0.05 < |βam| < 1.5$

When this parameter exceeds the upper limit, the size of the light-receiving surface of the light-power detection sensor 92 is increased and it becomes difficult to provide a small, inexpensive light-power detection optical system.

When the parameter is below the lower limit, Fno of the light-power detection optical system is reduced and it becomes difficult to provide aberration correction of the light-power detection optical system. Therefore, it becomes difficult to keep the light beams stationary on the light-power detection sensor 92.

In the present embodiment, |βam| is 1.27. Thus, the above expression is satisfied.

According to the present embodiment, in the structure for the light-power control (light-beam-intensity adjustment) for the light source in the optical scanning apparatus, the light-power-detection optical unit establishes an optically conjugate relationship between the deflecting surface of the deflecting unit and the light-receiving surface of the light-power detection sensor 92.

Therefore, while the light beams deflected and scanned by the deflecting surface are incident on the light-power detection optical element 91, the light beams incident on the light-receiving surface of the light-power detection sensor 92 are optically stationary on the light-receiving surface.

Accordingly, the storage time of the light beams on the light-power detector can be increased and variation in the power of light emitted by the light source (variations in the intensities of the light beams) due to heat generated by the light source itself and environmental variation (for example, ambient temperature variation) can be accurately detected.

Therefore, the powers of the light beams emitted from the light-emitting portions of the light source can be maintained constant.

Next, a light-power control method for controlling the powers of a plurality of light beams will be described.

In the above-described structure, the time in which the light beams can be kept stationary on the light-receiving surface of the light-power detection sensor 92 is limited to the time in which the light beams deflected by the deflecting unit are incident on the light-power detection optical element 91.

Therefore, when the number of light-emitting portions in the light source is increased, it becomes difficult to perform the light-power control by turning on all of the light-emitting portions in time-sharing in a single scanning cycle.

Therefore, in the present embodiment, the light-power control (light-beam-intensity adjustment) is performed by successively turning on the four light-emitting portions one at a time in each scanning cycle. Accordingly, the light-power control for all of the light-emitting portions is completed after four scanning cycles.

More specifically, in the present embodiment, the light-power control (light-beam-intensity adjustment) is performed by successively turning on the four light-emitting portions one at a time in each scanning cycle using a single deflecting surface of the polygon mirror. The light-power control for all of the light-emitting portions is completed after the polygon mirror is rotated by one turn.

In other words, the light-power adjustment is successively performed for the light-emitting portions one at a time in each scanning cycle, so that the light-power adjustment for all of the light-emitting portions in the light source is completed after a plurality of scanning cycles.

A single scanning cycle corresponds to a scanning process performed by a single surface of the polygon mirror.

This will be described in more detail below with reference to FIG. 12.

Figure 12:
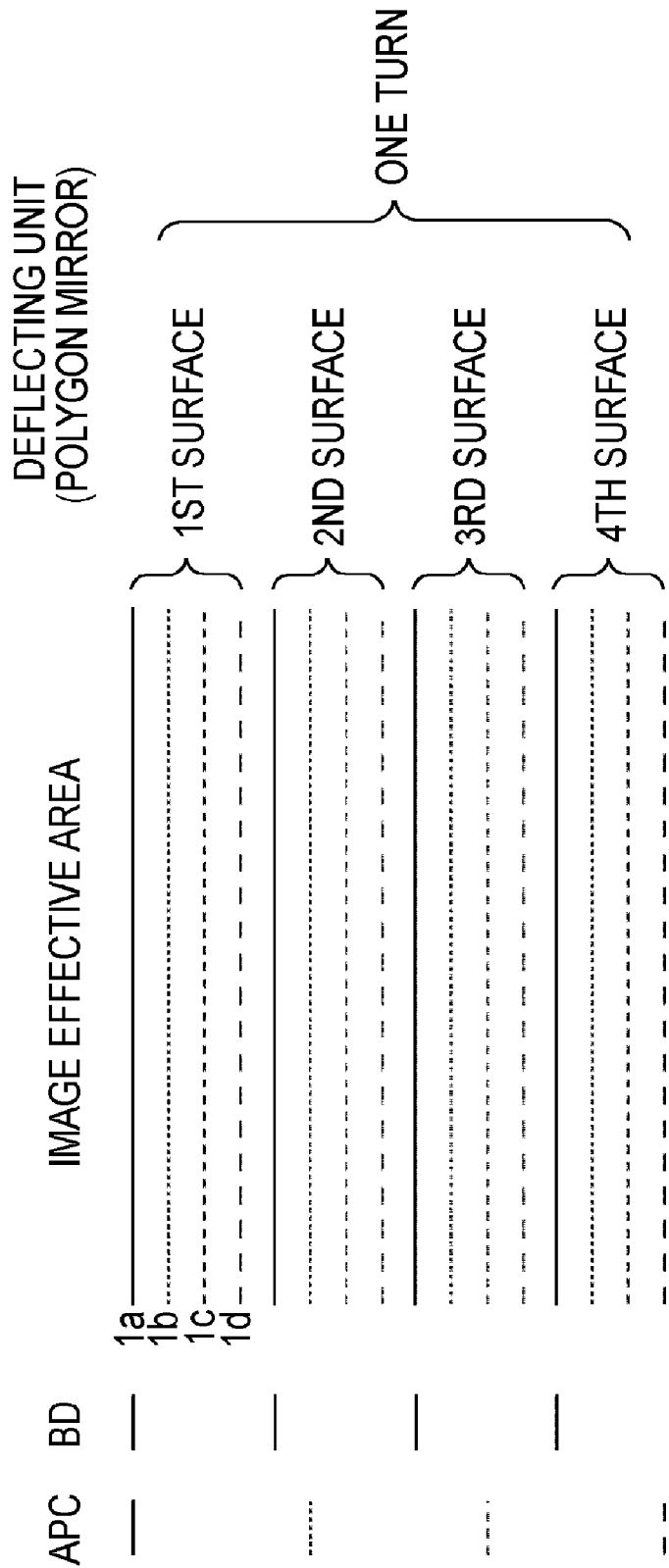
FIG. 12 is a time chart of light-power detection according to the first embodiment of the present invention.

FIG. 12 is a timing chart of scanning lines drawn for the automatic power control (APC) and synchronization detection and those drawn in the image effective area on the photosensitive drum surface 8.

As shown in FIG. 12, the automatic power control (APC) and the synchronization detection for controlling the light-emitting portions of the light source 1 are performed in that order before the four scanning lines 1a, 1b, 1c, and 1d are drawn in the image effective area using a first surface of the deflecting unit 5 (four-surface polygon mirror).

When the first surface of the deflecting unit 5 (four-surface polygon mirror) is used, only the light-emitting portion that emits the light beam corresponding to the scanning line 1a is subjected to the automatic power control (light-power adjustment).

In the synchronization detection, only the light beam corresponding to the scanning line 1a is detected by the synchronization detection sensor 72. With regard to the other three light beams corresponding to the scanning lines 1b, 1c, and 1d, write start positions on the photosensitive drum surface 8 in the main-scanning direction (write start times) are determined on the basis of the synchronization detection signal obtained by detecting the light beam corresponding to the scanning line 1a. The write start position on the photosensitive drum surface 8 in the main-scanning direction (write start time) for the light beam corresponding to the scanning line 1a is, of course, also determined by the synchronization detection signal obtained by detecting the light beam corresponding to the scanning line 1a.

Next, when a second surface of the deflecting unit 5 (four-surface polygon mirror) is used, only the light-emitting portion that emits the light beam corresponding to the scanning line 1b is subjected to the automatic power control (light-power adjustment).

Then, when a third surface of the deflecting unit 5 (four-surface polygon mirror) is used, only the light-emitting portion that emits the light beam corresponding to the scanning line 1c is subjected to the automatic power control (light-power adjustment).

Then, when a fourth surface of the deflecting unit 5 (four-surface polygon mirror) is used, only the light-emitting portion that emits the light beam corresponding to the scanning line 1d is subjected to the automatic power control (light-power adjustment).

In the synchronization detection, only the light beam corresponding to the scanning line 1a is detected by the synchronization detection sensor 72 for all of the first to fourth surfaces. With regard to the other three light beams corresponding to the scanning lines 1b, 1c, and 1d, write start positions on the photosensitive drum surface 8 in the main-scanning direction (write start times) are determined on the basis of the synchronization detection signal obtained by detecting the light beam corresponding to the scanning line 1a.

The write start position on the photosensitive drum surface 8 in the main-scanning direction (write start time) for the light beam corresponding to the scanning line 1a is, of course, also determined by the synchronization detection signal obtained by detecting the light beam corresponding to the scanning line 1a.

According to the present invention, the light-power control can be performed by the above-described sequence for the case in which the number of light-emitting portions is increased.

It is clear that the effects of the present invention can also be obtained when the four light-emitting portions are divided into two pairs and the light-power control is successively performed one pair at a time. Thus, the present invention is not limited to the above-described sequence.

Second Embodiment

Figure 11:
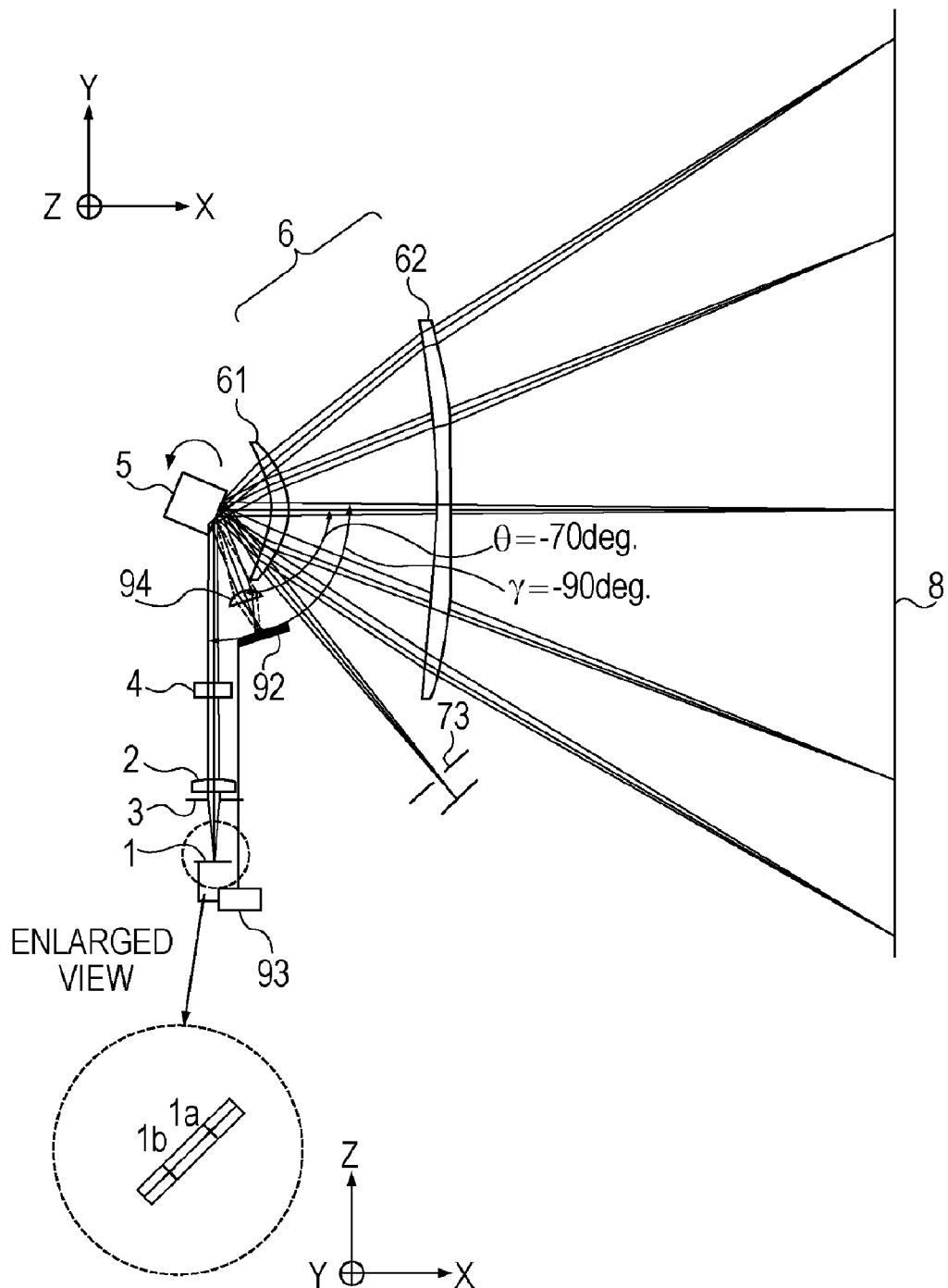
FIG. 11 is a main-scanning sectional view of the optical scanning apparatus according to the second embodiment of the present invention.

FIG. 11 is a main-scanning sectional view of an optical scanning apparatus according to a second embodiment of the present invention.

Figure 7:
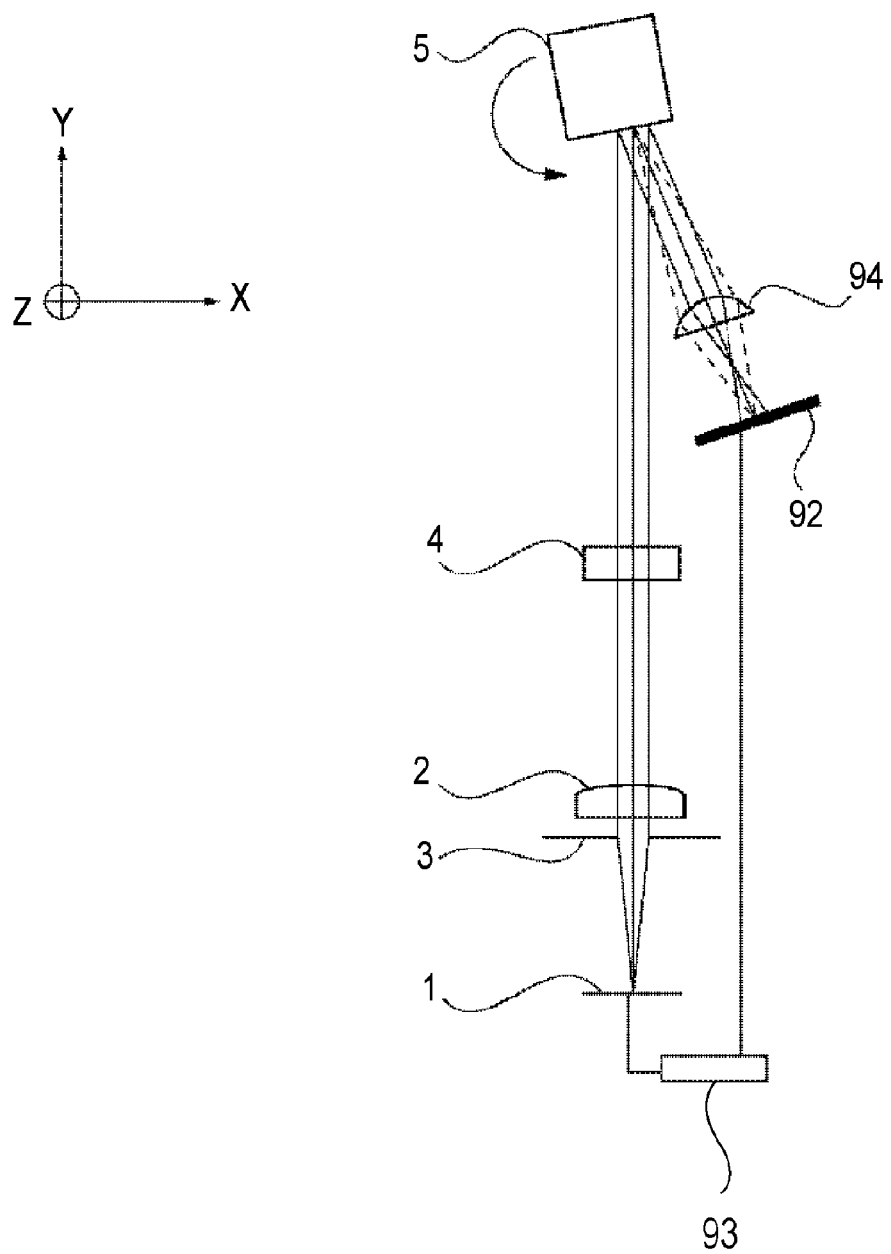
FIG. 7 is a main-scanning sectional view of an incident optical unit and a light-power detector included in an optical scanning apparatus according to a second embodiment of the present invention.

FIG. 7 is a main-scanning sectional view of an incident optical system including components 2, 3, and 4 and a light-power detection optical system included in the optical scanning apparatus according to the second embodiment of the present invention.

Figure 8:
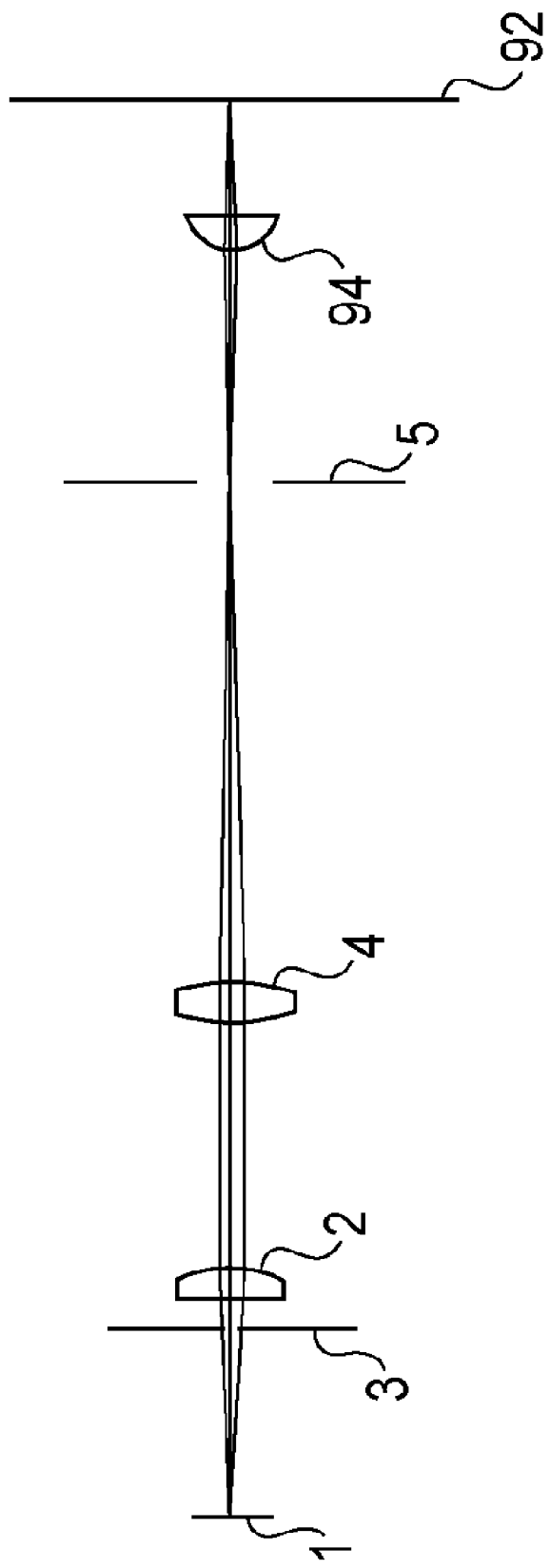
FIG. 8 is a sub-scanning sectional view of the incident optical unit and the light-power detector included in the optical scanning apparatus according to the second embodiment of the present invention.

FIG. 8 is a sub-scanning sectional view of the incident optical system including components 2, 3, and 4 and the light-power detection optical system included in the optical scanning apparatus.

The present embodiment differs from the first embodiment in that an edge emitting monolithic multilaser is used as a light source 1 and the imaging magnification of the light-power detection optical system is reduced. Other structures of the present embodiment are similar to those of the first embodiment.

The semiconductor laser 1, which functions as a light source, is an edge emitting monolithic multilaser including two light-emitting portions.

These two light-emitting points are arranged along respective lines that are disposed at predetermined angles relative to the main-scanning direction and the sub-scanning direction (see FIG. 11).

In the present embodiment, only one light beam is shown in FIGS. 11, 7, and 8 for simplicity.

Two divergent light beams output from two light-emitting portions of the semiconductor laser 1 are converted into two collimated light beams by a common collimating lens 2 after the widths thereof in the main-scanning direction and the sub-scanning direction are restricted by a diaphragm 3.

Then, the two light beams are incident on a cylindrical lens 4 having a refractive power only in the sub-scanning direction, and are focused on a reflective surface of a rotating polygon mirror 5 in the sub-scanning cross section.

In the main-scanning direction, the two collimated light beams are incident on the reflective surface of the polygon mirror 5 (four-surface polygon mirror) without a change.

The polygon mirror 5, which functions as a deflecting unit, is rotated by a drive unit (not shown), such as a motor, at a constant speed in the direction shown by the arrow.

Similar to the first embodiment, the two light beams deflected and scanned by the polygon mirror 5 are incident on an imaging optical system 6 having an fθ characteristic, and are then guided toward a photosensitive drum surface 8, which is a surface to be scanned. Thus, image recording is performed.

The imaging optical system 6 establishes an optically conjugate relationship between the deflecting surface of the polygon mirror 5 and a photosensitive drum surface in the sub-scanning cross section. Accordingly, a surface-tilt correcting system is provided in the optical scanning apparatus according to the present embodiment.

In the present embodiment, the imaging optical system 6 includes two toric lens 61 and 62 composed of plastic.

After the fθ characteristic is provided and the field curvatures in the main-scanning direction and the sub-scanning direction are corrected, the two light beams are guided toward the photosensitive drum surface 8.

The photosensitive drum surface 8 is optically scanned in +Y direction by rotating the polygon mirror 5 in the direction shown by the arrow.

In the light beams deflected by the polygon mirror 5 which functions as a deflecting unit, portions of the light beams that travel toward an area outside an image effective area are guided toward a synchronization detection sensor 72 through a synchronization-detection optical element 71.

The synchronization detection sensor 72 outputs a synchronization detection signal for determining timing for writing an image (write start position in the main-scanning direction).

Similarly, in the light beams deflected by the polygon mirror 5 which functions as a deflecting unit, portions of the light beams that travel toward an area outside an image effective area are guided toward a light-power detection sensor 92, which functions as a light-power detector, through a light-power detection optical element 94.

The light-power detection sensor 92 outputs a signal for controlling the power (intensity) of light emitted from the light source.

Thus, also in the present embodiment, light beams are deflected by the deflecting unit 5, and then the light-power control for the light source is performed using the deflected light beams.

The light-power detection sensor 92 detects the intensities (powers) of the light beams on the light-receiving surface thereof, and outputs intensity signals to a light-power controller 93 (automatic power control circuit).

Then, the light-power controller 93 (automatic power control circuit) outputs intensity correction signals for the two light-emitting portions 1a and 1b in the light source 1, which is an edge emitting laser, so that the intensities (powers) of the light beams emitted from the two light-emitting portions 1a and 1b are maintained as a predetermined set value.

Next, the light source used in the present embodiment will be described below.

As described above, the light source 1 according to the present embodiment is an edge emitting laser having two light-emitting points that are arranged adjacent to each other.

In the edge emitting laser, light is emitted in a direction perpendicular to an end face of the substrate and the output power can be easily increased compared to a surface emitting laser.

A rear light beam is emitted from the other end face of the substrate, and the light-power control can also be performed by directly monitoring the rear light beam.

However, in this case, the light-power control (automatic power control) is performed using a light beam that is not actually used for drawing an image. In addition, the light-receiving surface is easily affected by heat generated by the edge emitting laser itself. Therefore, it is difficult to perform high-accuracy light-power control.

Next, the light-power detection optical system will be described in detail below with reference to FIG. 7.

In order to keep the light beams stationary on the light-power detection sensor 92 for a predetermined time, the light-power detection optical element 94 is disposed so as to establish an optically conjugate relationship between the deflecting surface of the deflecting unit 5 and the light-receiving surface of the light-power detection sensor 92 in the main-scanning direction.

In other words, while the light beams deflected by the deflecting surface are incident on the light-power detection optical element 94, the light beams incident on the light-receiving surface of the light-power detection sensor 92 are optically stationary on the light-receiving surface.

Accordingly, the storage time of the light beams on the light-power detector 92 can be increased and variation in the power of light emitted by the light source 1 due to heat generated by the light source 1 itself and environmental variation (for example, ambient temperature variation) can be accurately detected.

Therefore, the powers of the light beams emitted from the light-emitting portions of the light source 1 can be maintained constant.

In FIG. 7, the solid lines show the actual light beams.

Referring to FIG. 7, in the main-scanning cross section, the collimated light beams deflected and scanned by the deflecting surface are once focused at a position between the light-power detection optical element 94 and the light-power detection sensor 92, and are then incident on the light-receiving surface of the light-power detection sensor 92.

The dashed lines show that the deflecting surface of the polygon mirror 5 and the light-receiving surface of the light-power detection sensor 92 are in the optically conjugate relationship in the main-scanning cross section.

In the main-scanning direction, the collimated light beams from the polygon mirror 5, which functions as a deflecting unit, are caused to converge at a position between the light-power detection optical element 94 and the light-power detection sensor 92 by the light-power detection optical element 94, and are then incident on the light-receiving surface of the light-power detection sensor 92 in the form of the divergent light.

Since an optically conjugate relationship is established between the deflecting surface of the deflecting unit 5 and the light-receiving surface of the light-power detection sensor 92, even when the deflecting surface of the deflecting unit rotates, the light beams incident on the light-power detection sensor 92 are stationary unless the light beams are displaced from the light-power detection optical element 94.

Since the divergent light beams are emitted from the polygon mirror 5 also in the sub-scanning direction, an optically conjugate relationship is also established between the deflecting surface of the polygon mirror 5 and the light-receiving surface of the light-power detection sensor 92, so that the light beams converge on the light-receiving surface.

Therefore, the light beams form line images that extend in the main-scanning direction on the light-receiving surface, similar to the deflecting surface.

Different from the first embodiment, in the present embodiment, the cylindrical lens 4 and the light-power detection optical element 94 are formed separately from each other. In addition, the semiconductor laser 1 and the light-power detection sensor 92 are formed on different substrates.

Since there is no layout restrictions, design freedom of the light-power detection optical system is increased. Accordingly, the sensor size can be further reduced by reducing the moving velocity of the light beams and the diameters of the light beams on the sensor.

In the present embodiment, the light-power control (light-beam intensity adjustment) is performed by successively turning on the two light-emitting portions one at a time in each scanning cycle using a single deflecting surface of the polygon mirror. Accordingly, the light-power control for the two light-emitting portions is completed after the polygon mirror is rotated by a half turn.

Table 2 shows the optical design values of the structure along the optical path from the light source 1 to the light-power detection sensor 92 via the deflecting unit

TABLE 2

| Optical Arrangement | | | | | | | |
|---|---|---|---|---|---|---|---|
| | No. | Ry | Rz | Asph | D | Glass | N |
| Light-Emitting Surface of Light Source 1 | 1 | | | | 1.75 | | |
| Cover Glass | 2 | | ∞ | | 0.25 | bsl7 | 1.51052 |
| | 3 | | ∞ | | 13.80 | | |
| Diaphragm 3 | 4 | | | | 2.53 | | |
| | 5 | | ∞ | | 3.00 | lah66 | 1.76167 |
| Collimating Lens 2 | 6 | | −15.216 | | 21.27 | | |
| Cylindrical Lens 4 | 7 | ∞ | 39.935 | | 3.00 | | 1.52397 |
| Deflecting Surface of Deflecting Unit 5 | 8 | ∞ | −51.630 | | 42.80 | | |
| | 9 | | ∞ | | 20.00 | | |
| Light-power detection optical element 91 | 10 | | 3.747 | k = −0.55699 | 3.00 | | 1.52397 |
| | 11 | | ∞ | | 10.00 | | |
| Sensor Surface of Light-power detection sensor 92 | 12 | | | | | | |
| Angle between optical axis of imaging optical system 6 and optical axis of incident optical system in main-scanning direction | | | | | θ | −90 deg. | |
| Angle between optical axis of imaging optical system 6 and optical axis of light-power detection optical system in main-scanning direction | | | | | γ | −70 deg. | |
| Light Source | | | | | | | |
| Wavelength | | | | | 790 nm | | |
| Number of Light-Emitting Portions | | | | | 2 (1 row × 2 lines) | | |
| Intervals between Light-Emitting Portions | | | | | 100 μm | | |

According to the above-described structure, the light beams are completely stationary in the main-scanning direction on the light-receiving surface of the light-power detection sensor 92 in a paraxial area.

However, the light beams slightly move on the light-receiving surface in practice due to the spherical aberration of the light-power detection optical element 94 in the main-scanning cross section.

Also in the present embodiment, to reduce the movement of the light beams on the light-receiving surface in the main-scanning direction, the incident surface of the light-power detection optical element 94 is formed as a rotationally symmetrical aspheric surface so that the spherical aberration can be corrected.

In other words, the incident surface of the light-power detection optical element 94 has a non-arc shape in the main-scanning cross section.

To achieve stable light-power detection, the length of the light-receiving surface of the light-power detection sensor 92 in the main-scanning direction must be larger than the beam diameter of the light beams on the light-power detection sensor 92 in the main-scanning direction.

Figure 9:
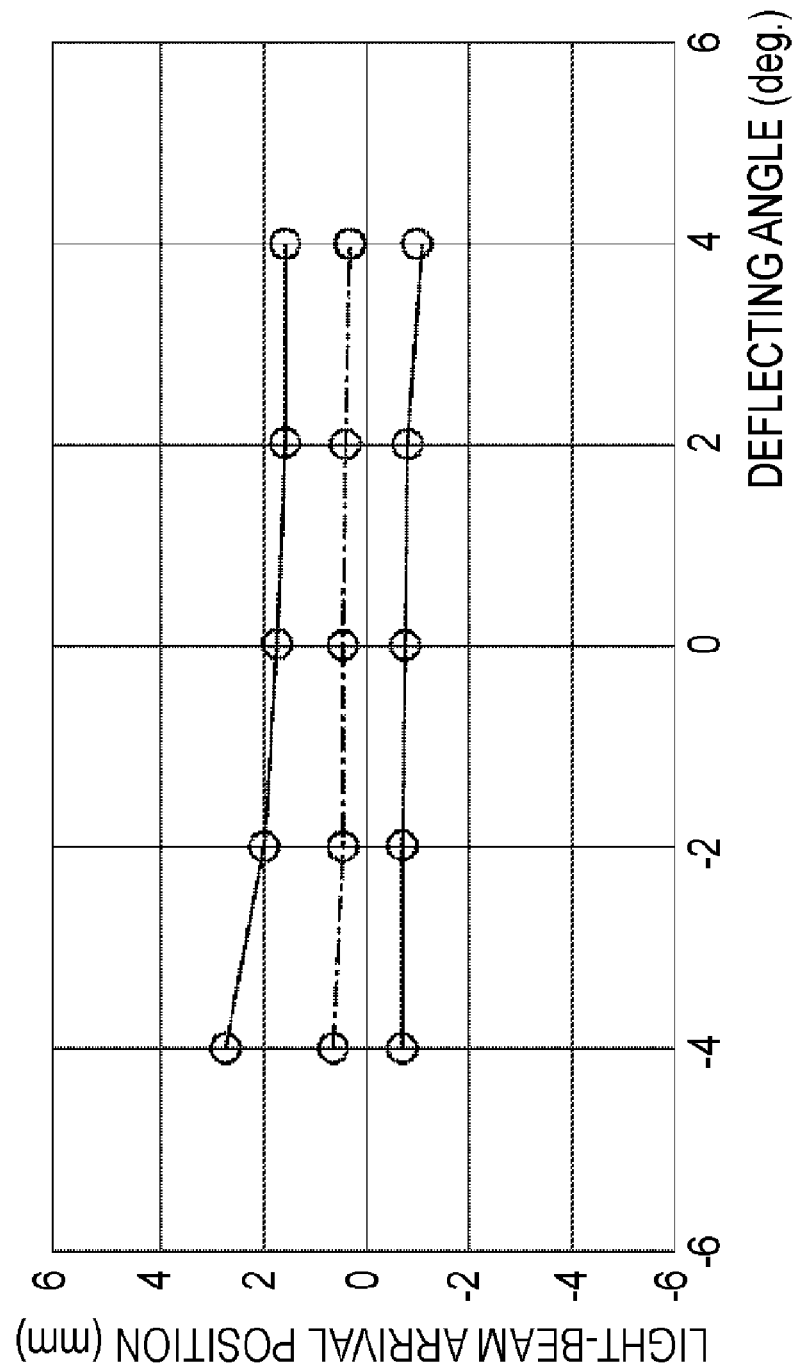
FIG. 9 is a diagram illustrating the manner in which a light beam on the light-power detector moves in response to the rotation of a deflecting unit according to the second embodiment of the present invention.
Figure 10:
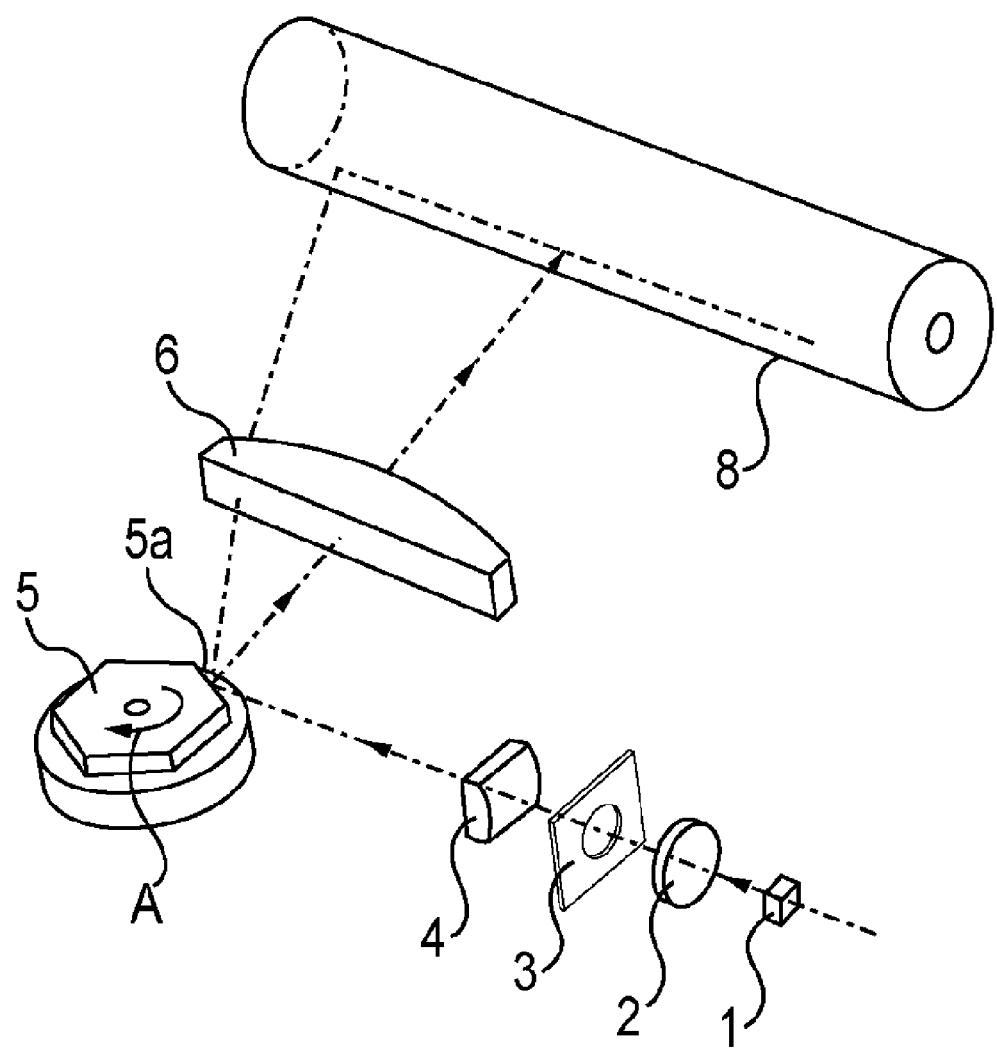
FIG. 10 is a perspective view of a conventional optical scanning apparatus.

FIG. 9 illustrates the manner in which a light beam on the light-power detection sensor 92 moves in response to the rotation of the deflecting unit 5.

In FIG. 9, the dot-dash line shows the principal ray of the light beam and the solid lines show the marginal rays of the light beam in the main-scanning direction.

In FIG. 9, the two marginal rays in the main-scanning direction are an upper ray and a lower ray.

In FIG. 9, the horizontal axis shows the deflecting angle of the light beam (positional reference of the light-power detection sensor 92) and the vertical axis shows the arrival position of the light beam (positional reference of the light-power detection sensor 92).

With regard to the positional reference of the light-power detection sensor 92, the optical axis of the light-power detection optical system (the optical axis of the light-power detection optical element 94) is set as a reference (zero) of the light-bam arrival position in the main-scanning cross section.

In FIG. 1, with the optical axis of the light-power detection optical system (the optical axis of the light-power detection optical element 94) being set as a reference (zero) of the light-beam arrival position, a clockwise movement of the light beam (direction in which the light-receiving surface is scanned by the light beam) is defined as negative and a counterclockwise movement of the light beam (direction in which the light beam approaches the imaging optical system 6 in the main-scanning direction) is defined as positive.

It is clear from FIG. 9 that, similar to the first embodiment, the arrival position of the light beam barely changes even when the deflecting angle of the polygon mirror 5 changes.

The scanning angular velocity Vapc on the light-power detection sensor in the light-power detection optical system can satisfy the following expression:

$$V_{apc} < f/10$$

where f is the fθ coefficient (mm/rad) of the optical scanning apparatus. When this parameter exceeds the upper limit, the size of the light-receiving surface of the light-power detection sensor 92 is increased and it becomes difficult to provide a small, inexpensive light-power detection optical system.

In the present embodiment, Vapc is 1.3 (mm/rad) and f is 150 (mm/rad). Thus, the above expression is satisfied.

An imaging magnification βam between the deflecting surface of the deflecting unit 5 and the light-receiving surface of the light-power detection sensor 92 provided by the light-power detection optical element 91 in the main-scanning direction can satisfy the following expression:

$$0.05 < |\beta_{am}| < 1.5$$

When this parameter exceeds the upper limit, the length of the light-receiving surface of the light-power detection sensor 92 in the main-scanning direction is increased and it becomes difficult to provide a small, inexpensive light-power detection optical system.

When the parameter is below the lower limit, Fno of the light-power detection optical system is reduced and it becomes difficult to provide aberration correction of the light-power detection optical system. Therefore, it becomes difficult to keep the light beams stationary on the light-power detection sensor.

In the present embodiment, |βam| is 0.73. Thus, the above expression is satisfied.

In the above-described first and second embodiments, in the structure for performing the automatic power control of the light source 1 in the optical scanning apparatus, the light-power detection optical element establishes an optically conjugate relationship between the deflecting surface of the deflecting unit and the light-receiving surface of the light-power detection sensor 92 in the main scanning direction.

Accordingly, in the first and second embodiments, while the light beams are incident on the light-power detection optical element 94, the light beams on the light-receiving surface of the light-power detection sensor 92 are optically stationary in the main-scanning direction.

As a result, according to the first and second embodiments, an inexpensive, simple structure for performing the light-power control without loss in the light-power can be provided.

In the first embodiment, a low-output light source, such as a vertical cavity surface emitting laser, can be used.

In the first end second embodiments, since the light-power control is performed using the actual image-drawing light beam, high-accuracy light-power control can be performed which can deal with change in laser characteristics, including far-field pattern (FFP), due to environmental variation (for example, ambient temperature variation).

In the first and second embodiments, a vertical cavity surface emitting laser including a plurality of light-emitting portions (4 beam) and an edge emitting monolithic multilaser including a plurality of light-emitting portions (2 beam) are used. However, the present invention is not limited to multi-beam lasers.

Similar to the case in which multibeam lasers are used, the effects of the present invention can also be obtained when a single-beam laser having a single light-emitting portion is used as the light source.

According to the present invention, the number of light-emitting portions of the multibeam laser is not limited as long as two or more light-emitting portions are provided. Since there is a growing demand for high-speed processes, the structure of the present invention can be effectively used in multibeam lasers that emit four or more light beams.

The reason for this is because in either of the vertical cavity surface emitting laser and the edge emitting monolithic multilaser, the output from each light-emitting portion is reduced as the number of light-emitting portions is increased.

In addition, in the first and second embodiments, the imaging optical system 6 includes two toric lenses 61 and 62. However, the present invention is not limited to this. According to the present invention, the imaging optical system 6 may also be composed of a single toric lens. In addition, the imaging optical system 6 may also be composed of three or more lenses. In addition, according to the present invention, the imaging optical system 6 may include a curved mirror or a diffractive optical element.

Third Embodiment

Figure 6:
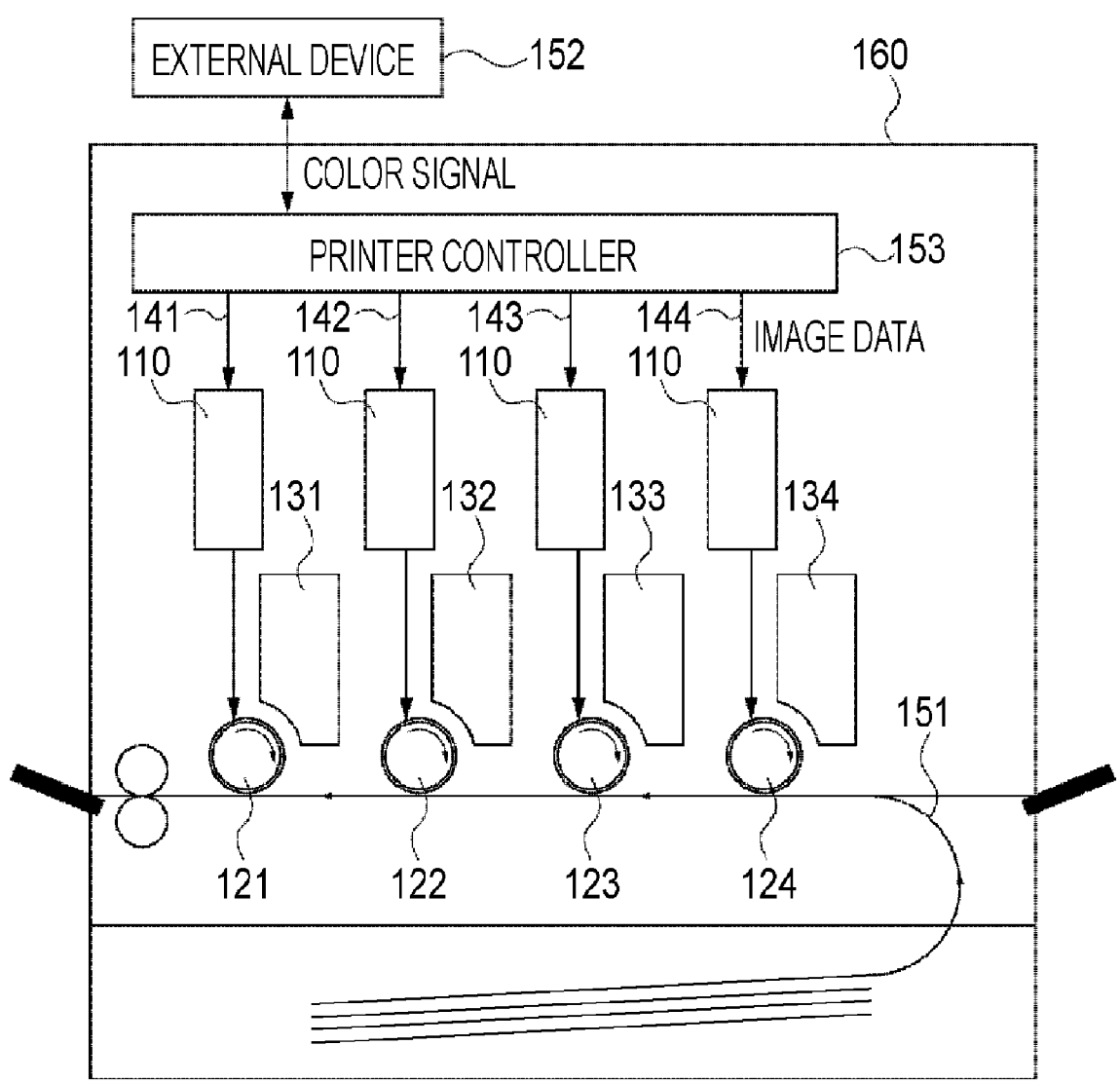
FIG. 6 illustrates an image-forming apparatus according to a third embodiment of the present invention.

FIG. 6 is a schematic diagram illustrating the main portion of a color image-forming apparatus according to a third embodiment of the present invention.

Referring to FIG. 6, a color image-forming apparatus 160 includes optical scanning apparatus 110, which each have the structure according to the above-described first embodiment, photosensitive drums 121, 122, 123 and 124 which each can function as an image carrier, developing devices 131, 132, 133 and 134, and a conveying belt 151.

Referring to FIG. 6, the color image-forming apparatus 160 receives red (R), green (G), and blue (B) signals from an external device 152, such as a personal computer.

These signals are respectively converted into image data elements (dot data elements) 141, 142, 143, and 144 for cyan (C), magenta (M), yellow (Y), and black (K), respectively, by a printer controller 153 included in the color image-forming apparatus 160.

The image data elements are input to the corresponding optical scanning apparatuses 110.

Each of the four optical scanning apparatuses 110 emits four light beams that are modulated in accordance with the corresponding image data element, and photosensitive surfaces of the photosensitive drums 121, 122, 123 and 124 are scanned in the main scanning direction by the 4×4 light beams.

In the color image-forming apparatus 160 according to the present embodiment, the 4×4 light beams emitted from the optical scanning apparatuses 110 in accordance with the respective image data elements are used to form latent images of the respective colors on the corresponding photosensitive drums 121, 122, 123, and 124. Then, the images are superimposed on a recording medium to obtain a single, full color image.

Reference numerals 131, 132, 133, and 134 denote developing devices. As described above, the light beams are modulated on the basis of the image data elements, and the surfaces of the photosensitive drums 121, 122, 123 and 124 are irradiated with the light beams so that electrostatic latent images are formed on the surfaces thereof. The electrostatic latent images are developed as toner images by the developing devices 131, 132, 133, and 134 disposed such that the developing devices 131, 132, 133, and 134 are in contact with the photosensitive drums 121, 122, 123 and 124, respectively, at positions on the downstream of the positions at which the photosensitive drums 131, 132, 133, and 134 are irradiated with the light beams in the rotating direction of the photosensitive drums 131, 132, 133, and 134.

The toner images developed by the developing devices 131, 132, 133, and 134 are transferred onto a paper sheet that can function as a transferring material by transferring rollers (not shown) disposed below the photosensitive drums 121, 122, 123 and 124 so as to face the photosensitive drums 121, 122, 123 and 124. Although the paper sheet is fed from a paper cassette disposed in front of the photosensitive drums 121, 122, 123 and 124 in this example, it can also be fed manually. A paper feed roller that is disposed at an end of the paper cassette conveys the paper sheet contained in the paper cassette to a transporting path.

The paper sheet on which the unfixed toner image is transferred as described above is further transported to a fixing device (not shown) disposed behind the photosensitive drums 121, 122, 123 and 124. The fixing device includes a fixing roller (not shown), which can have a fixing heater (not shown) therein, and a pressure roller (not shown) disposed so as to be in pressure contact with the fixing roller. The paper sheet conveyed from the transferring section is pressed and heated in a nip portion between the fixing roller and the pressure roller so that the unfixed toner image on the paper is fixed. Paper output rollers (not shown) are disposed behind the fixing roller and the paper sheet on which the image is fixed is output from the image-forming apparatus.

The external device 152 can include, for example, a color image reading apparatus, which can have a CCD sensor. In this case, a system including the color image reading apparatus and the color image-forming apparatus 160 can function as a color digital copying machine.

The optical scanning apparatus according to the first embodiment is not limited to color digital copy machines, and may also be applied to color laser beam printers, monochrome digital copy machines, monochrome laser beam printers, etc.

The optical scanning apparatus according to the second embodiment can also be applied to image-forming apparatus, such as laser beam printers and digital copy machines, that perform electrophotography processes.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An optical scanning apparatus comprising:
a light source that emits a light beam;
a deflecting unit having a deflecting surface that deflects and scans the light beam emitted from the light source;
a light-power detector that detects the intensity of the light beam deflected and scanned by the deflecting surface of the deflecting unit;
an imaging optical unit that focuses the light beam deflected and scanned by the deflecting surface of the deflecting unit on a surface to be scanned;
a light-power-detection optical unit for guiding the light beam deflected and scanned by the deflecting surface of the deflecting unit toward the light-power detector; and
an automatic power controller that controls the intensity of the light beam emitted from the light source on the basis of a signal obtained from the light-power detector,
wherein the light-power-detection optical unit establishes an optically conjugate relationship between the deflecting surface of the deflecting unit and a light-receiving surface of the light-power detector in the main-scanning plane.

2. The optical scanning apparatus according to claim 1, wherein an imaging magnification $\beta am$ between the deflecting surface of the deflecting unit and the light-receiving surface of the light-power detector in the main-scanning direction satisfies the following expression:

$$0.05 < |\beta am| < 1.5.$$

3. The optical scanning apparatus according to claim 1, wherein the size of the light-receiving surface of the light-power detector in the main-scanning direction is larger than a diameter of the light beam guided to the light-receiving surface in the main-scanning direction.

4. The optical scanning apparatus according to claim 1, wherein the light source includes a surface emitting laser having a plurality of light-emitting portions.

5. The optical scanning apparatus according to claim 1, wherein the light source includes an edge emitting laser having a plurality of light-emitting portions.

6. The optical scanning apparatus according to claim 1, wherein the light source includes a single laser beam.

7. The optical scanning apparatus according to claim 1, wherein the light-power-detection optical unit establishes an optically conjugate relationship between the deflecting surface of the deflecting unit and the light-receiving surface of the light-power detector in the sub-scanning plane.

8. The optical scanning apparatus according to claim 1, wherein the light source includes a multi-beam laser having a plurality of light-emitting portions that emit a plurality of light beams, the light beams being deflected and scanned by the same deflecting surface on the deflecting unit and being guided to the light-power detector by the light-power-detection optical unit, and
wherein the light beams deflected and scanned by the same deflecting surface are guided to the light-power detector in predetermined time intervals.

9. The optical scanning apparatus according to claim 1, wherein at least one surface of the light-power-detection optical unit has a non-arc shape in the main-scanning cross section.

10. An image-forming apparatus comprising:
an optical scanning apparatus according to claim 1;
a photosensitive body having a surface to be scanned;

a developing device that forms a toner image by developing an electrostatic latent image formed on the surface of the photosensitive body by the light beam scanned by the optical scanning apparatus;
a transferring device that transfers the toner image onto a transferring material; and
a fixing device that fixes the toner image transferred onto the transferring material.

11. An image-forming apparatus comprising:
an optical scanning apparatus according to claim 1; and
a printer controller that converts code data received from an external device into an image signal and inputs the image signal to the optical scanning apparatus.

* * * * *